Patented May 17, 1949

2,470,094

UNITED STATES PATENT OFFICE 2,470,094

MONOAZO DYE

Joseph B. Dickey, Rochester, N. Y., and James G. McNally, Oak Ridge, Tenn., assignors to Eastman Kodak Company, Rochester, N. Y., a corporation of New Jersey No Drawing. Application February 23, 1945, Serial No. 579,494

1 Claim. (Cl. 260—205)

This invention relates to new azo compounds useful as colorants. The present application is a continuation-in-part of our prior application Serial No. 343,264, filed June 29, 1940, now Patent Number 2,373,700.

The azo compounds of our invention can be represented by the general formula:

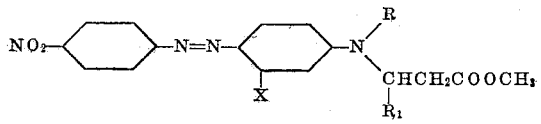

wherein R represents a hydroxyalkyl group containing 2 or 3 carbon atoms, a —CH$_2$CH$_2$COOCH$_3$ group or a

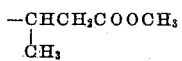

group, R$_1$ represents hydrogen or a methyl group and X represents hydrogen, methyl, ethyl or a halogen atom.

The azo compounds above defined are especially suited for the coloration of organic derivatives of cellulose, particularly cellulose acetate. Similarly the azo compounds of our invention are useful for the coloration of nylon and vinyl acetate-vinyl chloride co-polymers. Normally the material to be colored will be in the form of a textile material but it may be in another form such as a lacquer form. Lacquers that may be colored include, for example, those made of or containing organic derivatives of cellulose as well as those made from vinyl resins such as vinyl acetate, vinyl chloride and methyl-methacrylate. Coloration can be effected by dyeing, printing, stenciling or any other suitable method. The method of coloration selected, as well known to those skilled in the art, will depend upon the form of the material to be colored and the effect desired.

Dyeings of excellent fastness to light are obtained on organic derivatives of cellulose textile materials, particularly cellulose acetate textile materials. These dyeings are also characterized by good fastness to washing. Further the dye compounds of our invention dye cellulose acetate and organic derivatives of cellulose in general rapidly, possess good tinctorial power therefor and exhaust well.

The colorations obtained with the dye compounds of our invention range from yellowish-orange to reddish-orange. Yellowish-orange colors are obtained when the member X is halogen while reddish-orange colors are obtained when X is methyl or ethyl. When X is hydrogen an orange color intermediate of yellowish-orange and reddish-orange is obtained.

The azo compounds of our invention likewise yield dyeings on cellulose acetate textile materials and organic derivatives of cellulose textile materials generally which are definitely superior with respect to light fastness to dyeings obtained with dyes having an exactly similar structure except that the ester group attached to the amino group of the coupling component is

—CH$_2$COOCH$_3$ rather than —CH$_2$CH$_2$COOCH$_3$ or

as in the present instance. This surprising and important difference could not have been predicted.

It is an object of our invention to provide a new class of azo compounds suitable for the coloration of organic derivatives of cellulose, nylon, vinyl acetate-vinyl chloride co-polymers and lacquers such as cellulose ester, cellulose ether and vinyl resin lacquers. Another object of our invention is to provide colored textile materials which are of excellent fastness to light and of good fastness to washing. A particular object of our invention is to provide a new class of azo dyes suitable for the coloration of cellulose acetate textile materials.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our invention will be illustrated more particularly in connection with the coloration of cellulose acetate, a material to which the invention is especially adapted, it will be understood that it applies to the coloration of other organic derivatives of cellulose such as those just named as well as to the coloration of the other materials mentioned herein.

The azo dye compounds of our invention can be prepared by diazotizing p-nitroaniline and coupling the diazonium compound obtained with the coupling compounds having the general formula:

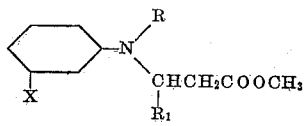

wherein R, R$_1$ and X have the meaning previously assigned to them.

The following examples illustrate the preparation of the azo dye compounds of our invention.

Example 1

138 grams (1 gram mole) of p-nitroaniline are heated at 60° C. in a mixture of 163 grams of sulfuric acid (95%) and 200 cc. of water until the amine has dissolved following which the reaction mixture resulting is poured onto 300 grams of ice with vigorous stirring. The p-nitroaniline is then diazotized by adding all at once a solution of 80 grams of sodium nitrite in 250 cc. of water. Upon completion of the diazotization reaction the excess nitrous acid present is destroyed by adding 10 grams of urea.

Concurrently with the preparation of the diazo solution 265 grams (one gram mole) of the dimethyl ester of N-bis (β-carboxyethyl) aminobenzene are dissolved in a mixture consisting of 300 cc. of water, 56 grams of 95% sulfuric acid and 300 grams of ice. The diazo solution prepared above is then added with stirring and after a short time sodium carbonate is slowly added until the reaction mixture is just acid to litmus. The reaction mixture is tested for the presence of the diazo compound, with β-naphthol paper for example, and if no diazo compound is present, enough is added to just utilize any unreacted coupling component. The proper amount to be added can be determined by the β-naphthol test just mentioned as the presence of any free diazo compound can be readily detected by this test. Upon completion of the coupling reaction which takes place, the dye compound formed is recovered by filtration, washed with water and dried. The yield of dye exceeds 99%. The dye compound obtained has the formula:

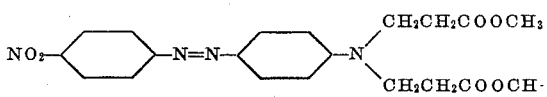

Example 2

138 grams (1 gram mole) of p-nitroaniline are diazotized and the diazonium compound obtained is coupled with 237 grams (1 gram mole) of the methyl ester of N-β-carboxy-α-methyl-ethyl-N-β-hydroxyethyl aminobenzene. The diazotization, coupling and dye recovery operations are carried out in accordance with the procedure described in Example 1. The dye compound obtained has the formula:

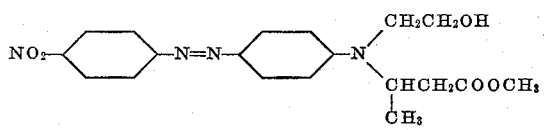

Example 3

138 grams (1 gram mole) of p-nitroaniline are diazotized and the diazonium compound obtained is coupled with 257.5 grams (1 gram mole) of the methyl ester of N-β-carboxyethyl-N-β-hydroxyethyl-3-chloro aminobenzene. The diazotization, coupling and dye recovery operations are carried out in accordance with the procedure described in Example 1. The dye compound obtained has the formula:

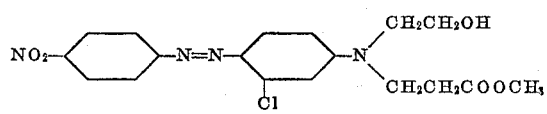

The following tabulation further illustrates the azo compounds included within the scope of our invention. The diazotization, coupling and recovery operations involved in the preparation of these dye compounds can be carried out in accordance with the procedure described hereinbefore.

Examples

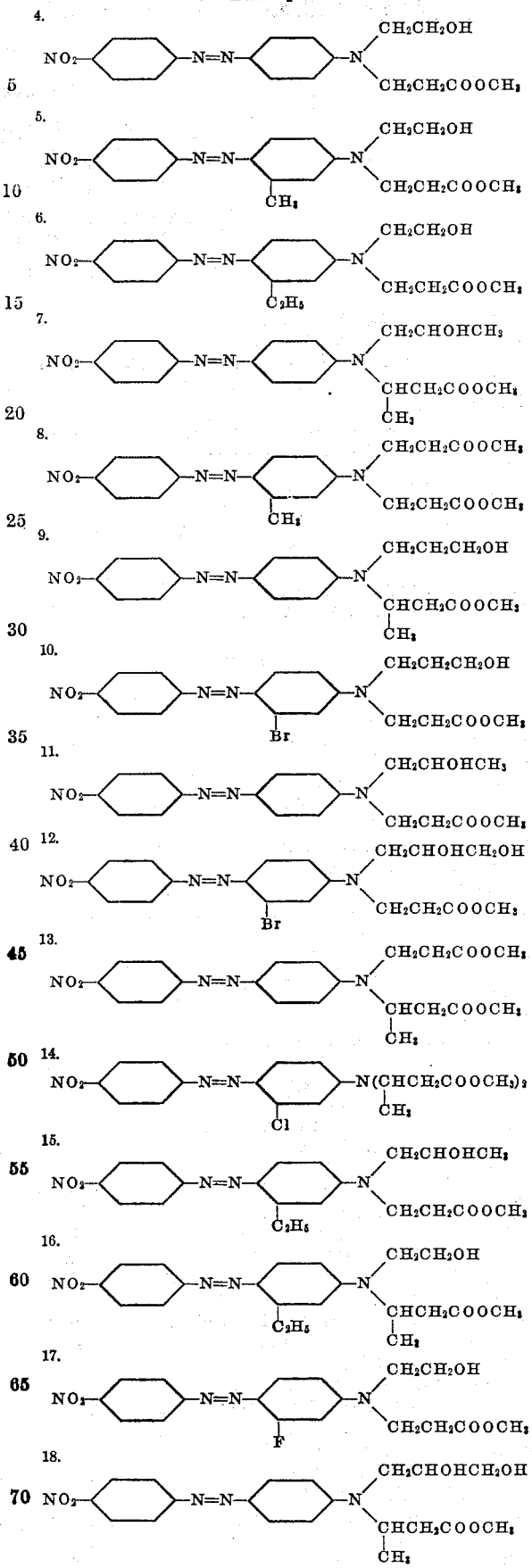

The compounds specifically disclosed herein are intended to be illustrative and not limitative of our invention as other compounds within the scope of the invention can be prepared.

In order that the preparation of the azo compounds of our invention may be entirely clear the preparation of the coupling components used in their manufacture is given hereinafter.

A. Preparation of dimethyl ester of N-bis (β-carboxyethyl) aminobenzene 93 grams (1 gram mole) of aniline, 129 grams (1.5 gram mole) of methyl acrylate and 10 cc. of glacial acetic acid are heated together in a suitable reaction vessel on a steam bath for 72 hours. On fractionation of the reaction mixture under reduced pressure (2 mm., for example) there is obtained the monomethyl ester of N-β-carboxyethyl aminobenzene boiling at 113–116° C./2 mm. and the dimethyl ester of N-bis (β-carboxyethyl) aminobenzene boiling at 165–170° C./2 mm. This latter compound has the formula:

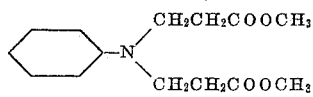

B. Preparation of methyl ester of N-β-carboxy-α-methyl-ethyl-N-β-hydroxyethyl aminobenzene 93 grams (1 gram mole) of aniline, 125 grams (1.25 gram mole) of methyl crotonate (CH₃CH₂=CHCOOCH₃)

and 10 cc. of glacial acetic acid were heated together in a suitable reaction vessel on a steam bath for 77 hours. On fractionation of the reaction mixture under reduced pressure (e. g. 9 mm.) the methyl ester of N-β-carboxy-α-methyl-ethyl aminobenzene boiling at 144–146° C./9 mm. is obtained. The yield was 58 grams or 30% of theory.

193 grams (1 gram mole) of the methyl ester of N-β-carboxyl-α-methyl-ethyl aminobenzene are heated with 48.4 grams (1.1 gram mole) of ethylene oxide at 180° C. in a shaking autoclave for 6 hours. When cool the reaction mixture is removed from the autoclave and distilled under reduced pressure (e. g. 9 mm.) to give a good yield of the methyl ester of N-β-carboxy-α-methyl-ethyl-N-β-hydroxyethyl aminobenzene having the formula:

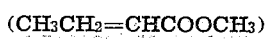

and boiling at 195–202° C./9 mm.

C. Preparation of methyl ester of N-β-carboxyethyl-N-β-hydroxyethyl-3-chloro-aminobenzene 127.5 grams (1 gram mole) of m-choroaniline, 129 grams (1.5 gram mole) of methylacrylate and 10 cc. of glacial acetic acid are heated together in a suitable reaction vessel on a steam bath for 72 hours. On fractionation of the reaction mixture at reduced pressure (e. g. 3 mm.) the methyl ester of N-β-carboxyethyl-3-chloro-aminobenzene boiling at 135–137° C./3 mm. is obtained.

257.5 grams (1 gram mole of the methyl ester of N-β-carboxyethyl-3-chloro-aminobenzene are heated with 48.4 grams (1.1 gram mole) of ethylene oxide at 180° C. in a shaking autoclave for 6 hours. When cool the reaction mixture is removed from the autoclave and distilled under reduced pressure (e. g. 3 mm.) to give a good yield of the methyl ester of N-β-carboxyethyl-N-β-hydroxyethyl-3-chloro-aminobenzene having the formula:

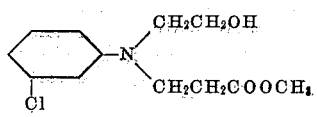

and boiling at 190–193° C./3 mm.

D. Preparation of the methyl ester of N-β-carboxyethyl-N-β,γ-dihydroxypropyl-3-bromo-aminobenzene 172 grams (1 gram mole) of m-bromoaniline, 86 grams (1 gram mole) of methyl acrylate and 8 cc. of glacial acetic acid are heated together at 96–98° C. on the steam bath for 65 hours. The acetic acid was then neutralized with NaHCO₃ and the reaction mixture extracted with ether. The ether layer was washed with water, the ether removed by distillation under reduced pressure on a water bath, and the remaining oily liquid distilled under a pressure of 3 mm. A 75% yield of the methyl ester of N-β-carboxyethyl-3-bromo-aminobenzene boiling at 157–160° C./3 mm. is obtained.

129 grams (.5 gram mole) of the methyl ester of N-β-carboxyethyl-3-bromo-aminobenzene, 66 grams (.6 gram mole) of glycerol monochlorohydrin ClCH₂CHOHCH₂OH and 51.6 grams (.6 gram mole of NaHCO₃ are heated at 145° C. with stirring for 5 hours in an oil bath. The reaction mixture is cooled to 100° C. and 100 cc. of water and 100 cc. of benzene are added. The oil layer was washed with water and the benzene removed by distillation under reduced pressure on a water bath. The viscous liquid remaining, consisting essentially of the methyl ester of N-β-carboxyethyl-N-β,γ-dihydroxypropyl-3-bromo-aminobenzene having the formula

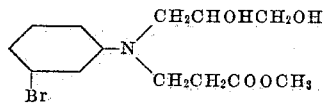

was bottled for use without further distillation.

E. Preparation of the dimethyl ester of N-β-carboxyethyl-N-β-carboxy-α-methyl-ethyl aminobenzene 19.3 grams (.1 gram mole) of the methyl ester of N-β-carboxy-α-methyl-ethyl aminobenzene, 9.4 grams (.11 gram mole) of methyl acrylate and 5 cc. of glacial acetic acid were heated together on a steam bath for 135 hours. The reaction mixture was distilled under reduced pressure (e. g. 3 mm.) to obtain the dimethyl ester of N-β-carboxyethyl-N-β-carboxy-α-methyl-ethyl aminobenzene having the formula:

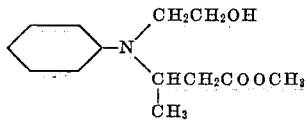

and boiling at 176–178° C./3 mm. The yield was 7 grams or 25% of theory.

F. Preparation of the methyl ester of N-β-carboxy-α-methyl-ethyl-N-γ-hydroxypropyl aminobenzene 19.3 grams (.1 gram mole) of the methyl ester of N-β-carboxy-α-methyl-ethyl aminobenzene, 11.2 grams (.12 gram mole) of trimethylene chlorohydrin, 10 grams (.12 gram mole) of NaHCO₃ and 25 cc. of toluene were refluxed together for 8 hours with stirring. After cooling to 100° C. 25 cc. of water were added to the reaction mixture. The water layer was drained off, the toluene fraction washed with water, and the water layer formed removed by draining. The toluene fraction was then distilled under a reduced pressure of 5 mm. to recover the methyl ester of N-β-carboxy-α-methyl-ethyl-N-γ-hydroxypropyl aminobenzene having the formula:

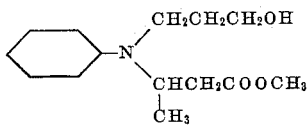

and boiling at 174–178° C./5 mm. It will be understood, of course, that the toluene is recovered in the earlier stages of the distillation.

G. *Preparation of the methyl ester of N-β-carboxyethyl-N-β-hydroxyethyl aminobenzene*

179 grams (1 gram mole) of the methyl ester of N-β-carboxyethyl aminobenzene and 48.5 grams (1.1 gram mole) of ethylene oxide are heated together at 170–180° C. in a shaking autoclave for 6 hours. On cooling the reaction mixture is removed from the autoclave and distilled under a reduced pressure of 2 mm. A good yield of the methyl ester of N-β-carboxyethyl-N-β-hydroxyethyl aminobenzene having the formula:

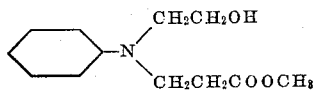

and boiling at 170–175° C./2 mm. is obtained.

H. *Preparation of the methyl ester of N-β-carboxyethyl-N-β-hydroxyethyl-3-methyl aminobenzene*

By the substitution of an equivalent molecular weight of meta toluidine for aniline in reaction A the methyl ester of N-β-carboxyethyl-3-methyl aminobenzene can be obtained. When this compound is reacted with ethylene oxide in accordance with the procedure described, for example, in reaction G the methyl ester of N-β-carboxyethyl-N-β-hydroxyethyl-3-methyl aminobenzene boiling at 168–170° C./3 mm. is obtained.

I. *Preparation of the methyl ester of N-β-carboxyethyl-N-β-hydroxyethyl-3-ethyl aminobenzene*

This compound can be prepared by substituting an equivalent molecular weight of meta ethylaniline for meta toluidine in the preceding reaction.

J. *Preparation of the methyl ester of N-β-carboxyethyl-N-β-hydroxypropyl-3-ethyl aminobenzene*

This compound can be prepared by reacting meta-ethylaniline with methyl acrylate, recovering the methyl ester of N-β-carboxyethyl-3-ethyl aminobenzene thus formed and reacting it with propylene oxide. The reactions above indicated as well as the recovery operations involved can be carried out in accordance with the procedure indicated in Examples A to I inclusive.

K. *Preparation of the methyl ester of N-β-carboxy-α-methyl-ethyl-N-β,γ-dihydroxypropyl aminobenzene*

21 grams of the methyl ester of N-β-carboxy-α-methyl-ethyl aminobenzene and 10 grams of sodium bicarbonate are mixed together and heated to 140° C. 13 grams of glycerol chlorohydrin are then added dropwise with stirring over a period of 30 minutes while maintaining a temperature of about 140° C. Heating is continued until no more carbon dioxide is evolved. Upon cooling water is added to dissolve out water-soluble salts in the reaction mixture and after settling the water layer is drawn off. The reaction mixture remaining is then treated with benzene following which it is subjected to distillation to remove the water and benzene present. On evaporation to relative dryness the desired product is obtained as a brown, heavy, viscous oil. This oil cannot be distilled without some decomposition but since it consists almost entirely of the desired product, purification is not essential. The compound obtained is soluble in most organic solvents as well as in dilute hydrochloric acid and dilute sulfuric acid. We would here note that the coupling compounds of our invention containing a β,γ-dihydroxylpropyl group are subject to decomposition when distilled and therefore one should not attempt to purify these compounds by distillation. Some pyrolysis of the β,γ-dihydroxypropyl group appears to take place on distillation.

By following the procedures set forth in Examples A to K, inclusive, the following coupling compounds, for example, can be prepared: The methyl ester of N-β-carboxy-α-methyl-ethyl-N-β-hydroxypropyl aminobenzene (B. P. 203–206° C./7 mm.); the dimethyl ester of N-bis-(β-carboxyethyl)-3-methyl aminobenzene (B. P. 165–169° C./3 mm.); the methyl ester of N-β-carboxyethyl-N-γ-hydroxypropyl-3-bromo-aminobenzene; the methyl ester of N-β-carboxyethyl-N-β-hydroxypropyl aminobenzene (B. P. 180–185° C./1 mm.); the dimethyl ester of N-bis (β-carboxy-α-methyl-ethyl)-3-chloro aminobenzene; the methyl ester of N-β-carboxy-α-methyl-ethyl-N-β-hydroxyethyl-3-ethyl aminobenzene and the methyl ester of N-β-carboxyethyl-N-β-hydroxyethyl-3-fluoro aminobenzene.

While the use of glacial acetic acid has been referred to in the reactions describing the preparation of the coupling compounds of our invention it is here noted that the use of glacial acetic acid is not essential as acetic acid of lesser strength can be used. However, the use of glacial acetic acid or highly concentrated aqueous acetic acid solutions appears desirable.

The azo compounds of our invention may be advantageously directly applied to the textile material undergoing coloration in the form of an aqueous suspension which can be prepared by grinding the dye to a paste, in the presence of a sulfonated oil soap, or other suitable dispersing agent and dispersing the resulting paste in water. Direct dyeing operations can, with advantage, be conducted at temperatures of about 70° C. to 85° C., but any suitable temperature may be used. Thus the textile material to be dyed or colored is ordinarily added to the dyebath at a temperature lower than that at which the main portion of the dyeing is to be effected, e. g. a temperature of from 45° to 55° C. Following this the temperature is raised to that selected for carrying out the operation. The temperature at which the process is carried out may vary somewhat, depending upon the particular material undergoing coloration. As understood by those skilled in the art, the intensity of dyeing can be varied by varying the proportion of dye to the material undergoing preparation. Generally speaking, 1 to 3 per cent by weight of the dye to material is employed, although any desired proportions can be used.

Suitable dispersing agents are disclosed in U. S. Patent 2,115,030, issuing April 26, 1938. The process disclosed in the aforesaid patent for the dyeing of cellulose acetate can be used in applying the dyes in the present invention to cellulose acetate. While a satisfactory method for dyeing has been disclosed herein, it will be understood that any other suitable methods for dyeing the non-vegetable textile materials named herein can be employed. Lacquers may be colored with the dye compounds of our invention by the methods customarily employed in the lacquer art.

The term nylon is intended to describe a linear polyamide resin such as set forth in United States Patent 2,071,250, dated February 16, 1937.

We would here note that the process described for the introduction of the —CH$_2$CH$_2$COOCH$_3$ and the

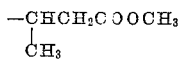

groups is not restricted to the coupling compounds disclosed herein but is generally applicable to aniline and its derivatives. To illustrate it is applicable wherein the member X also represents an alkoxy group, an acylamino group or an alkyl group having more than one carbon atom. Similarly the member R may also represent delta hydroxybutyl, an alkoxyalkyl group or a hydroxyalkoxyalkyl group, such as β-hydroxy-β-ethoxyethyl, for example. The compounds just indicated can be used as coupling components in the preparation of azo dyes. They can, for example, be coupled with diazotized p-nitroaniline to form azo compounds suitable for the coloration of cellulose carboxylic ester textile materials.

We claim:

The azo compound having the formula:

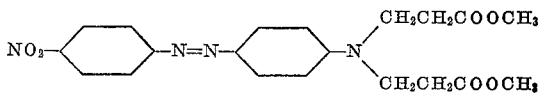

JOSEPH B. DICKEY.
JAMES G. McNALLY.

REFERENCES CITED

The following references are of record in the file of this patent:

UNITED STATES PATENTS

| Number | Name | Date |
|---|---|---|
| 2,045,324 | Felix et al. | June 23, 1936 |
| 2,082,156 | Felix et al. | June 1, 1937 |
| 2,173,052 | Hitch et al. | Sept. 12, 1939 |
| 2,213,740 | McNally et al. | Sept. 3, 1940 |
| 2,249,749 | Dickey et al. | July 22, 1941 |
| 2,277,230 | Heinrich | Mar. 24, 1942 |
| 2,314,440 | Boch et al. | Mar. 23, 1943 |
| 2,349,899 | Boch | May 30, 1944 |

FOREIGN PATENTS

| Number | Country | Date |
|---|---|---|
| 669,168 | France | July 27, 1929 |
| 824,444 | France | Nov. 10, 1937 |
| 840,512 | France | Jan. 16, 1939 |